Oct. 9, 1934.    A. E. HINE    1,976,226
DEVICE FOR TRANSMITTING INTERMITTENT MOTION
Filed Nov. 10, 1932    2 Sheets-Sheet 1

INVENTOR.
Alfred E. Hine.
BY
ATTORNEY.

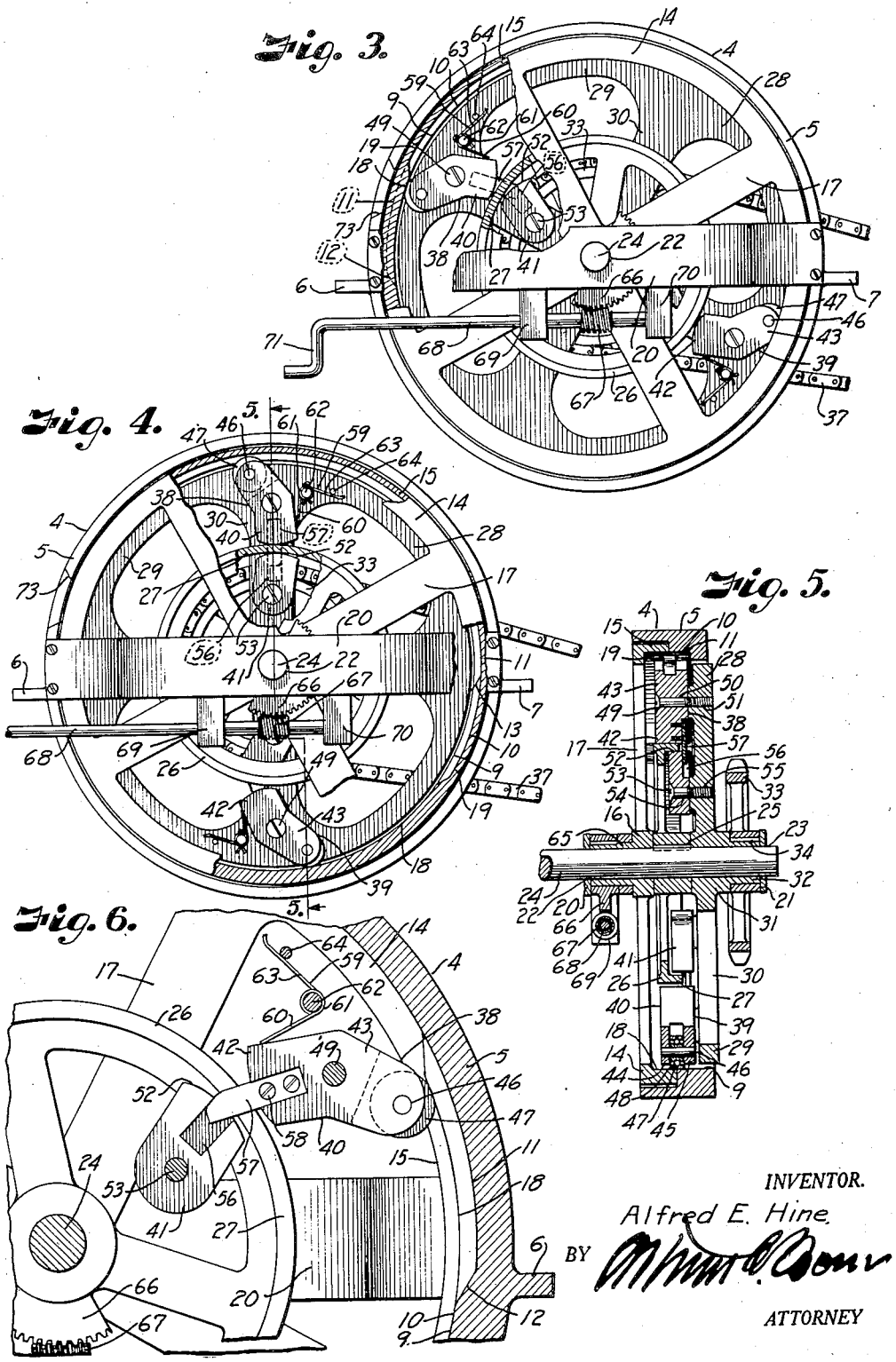

Patented Oct. 9, 1934

1,976,226

UNITED STATES PATENT OFFICE 1,976,226

DEVICE FOR TRANSMITTING INTERMITTENT MOTION

Alfred E. Hine, Sedalia, Mo., assignor to Eric W. Bacharach, Kansas City, Mo.

Application November 10, 1932, Serial No. 642,046

6 Claims. (Cl. 74—125.5)

This invention relates to transmissions and more particularly to a device for converting constant rotary movement of a driving member into intermittent rotary movement of a driven member, and has for its principal object to selectively vary the increments of movement of the driven member from zero to the full rotative movement of the driving member.

It is also an object of the invention to provide means for varying the increments of movement while the transmission is in operation.

In accomplishing these and other objects of the invention, I have provided improved details of structure, the preferred form of which is illustrated in the accompanying drawings, wherein:

Fig. 3 is a side elevational view of the transmission showing one of the cam members broken away to better illustrate the clutch members for operably connecting the driving member with the driven member, the clutch members being shown in released position.

Fig. 4 is a similar view showing one pair of the clutch members in driving relation with the driven member.

Fig. 5 is a vertical cross sectional view through the transmission on the line 5—5, Fig. 4.

Fig. 6 is an enlarged detail sectional view through the transmission, particularly illustrating the clutch members for effecting driving relation between the driving and driven members.

Referring more in detail to the drawings:—

1 designates a base having spaced vertical posts 2 and 3 for supporting an outer ring member 4 which encloses the driving and driven members of the transmission and the cam tracks controlling the clutch members later described.

Figure 1:
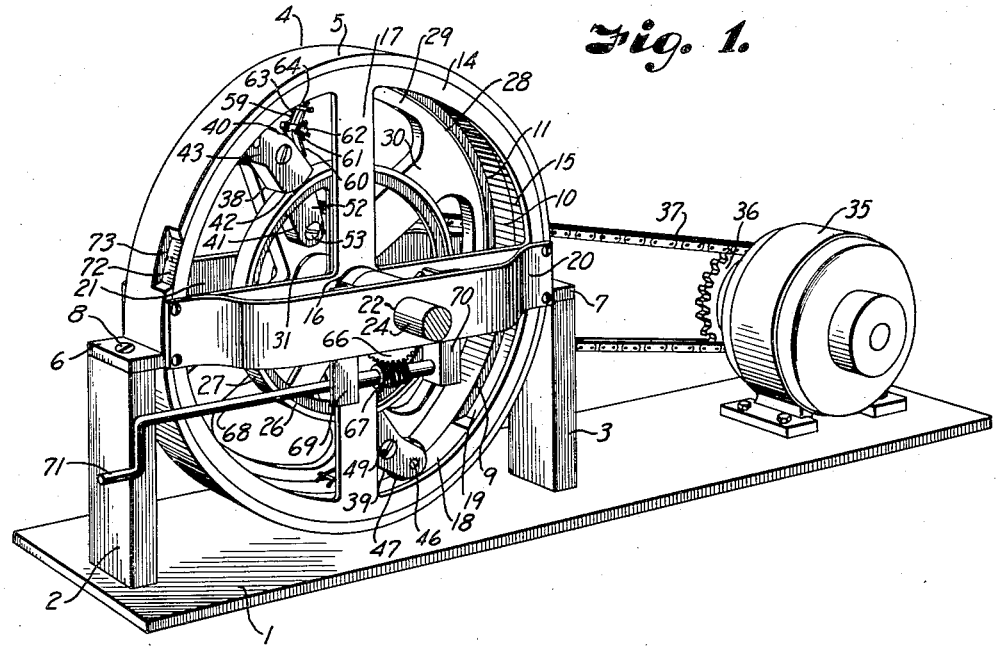
Fig. 1 is a perspective view of a transmission constructed in accordance with my invention.
Figure 2:
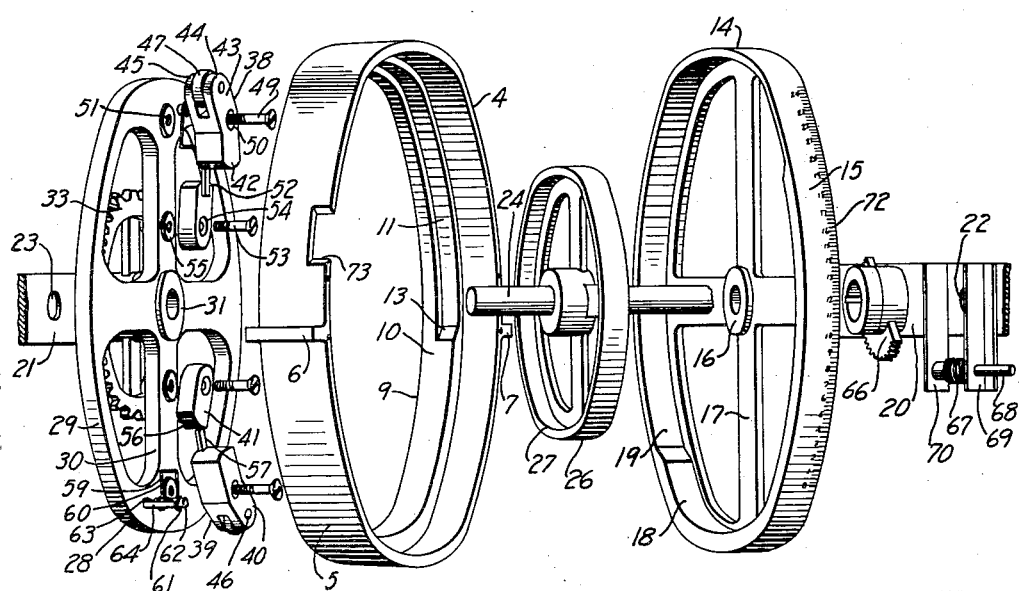
Fig. 2 is a detail perspective view of the major parts of the transmission shown in disassembled spaced relation.

The member 4 preferably comprises a circular band 5 having radial lugs 6 and 7 projecting from the outer face thereof for attachment to the posts 2 and 3 by fastening devices 8 which extend through the lugs and into the upper ends of the posts illustrated in Fig. 1. The inner face of the band 5 is provided with an inwardly extending circumferential flange 9 extending substantially halfway across the width thereof to form an annular cam track 10, including a depressed portion 11, which merges into the surface of the flange on inclines 12 and 13. The depressed portion extends substantially half the inner circumference of the band, as illustrated in Fig. 2.

Movably mounted in the opposite side of the band 5, in juxtaposition with the track 10, is a movable circular track member 14 having an inwardly extending annular flange 15 supported from a hub portion 16 by spokes 17. The inner face of the rim 18 aligns with the inner face of the track 10 and is provided with a depressed track portion 19 similar to the depressed track portion 11 in the band 5 and which cooperates therewith to control the extent of engagement or disengagement of the clutch members with the driven member, as later described.

Fixed to the opposite side faces of the band 5 and extending horizontally thereacross are spaced bars 20 and 21 having bearing openings 22 and 23 for mounting a driven shaft 24 which also extends through the hub 16 of the track member 14.

Fixed to the shaft 24 by a spline 25 is a driven member 26 comprising a wheel having a laterally extending flange 27 on its side opposite to the track member 14 adapted to be engaged by driving mechanism on a driving member 28. The driving member 28 is rotatably mounted on the shaft adjacent the driven member and includes a rim 29 supported by spokes 30 extending radially from a hub portion 31 rotatably mounted on the shaft 24. The hub 31 is provided with a reduced sleeve portion 32 on which is fixed a drive sprocket 33 by a spline 34.

The sprocket 33 is driven by a suitable prime mover such as a motor 35 also mounted on the base 1 adjacent the transmission, as illustrated in Fig. 1. The armature shaft of the motor is provided with a sprocket 36 aligning with the sprocket 33, and operating over the sprockets is a drive chain 37.

It is thus apparent that with the construction thus far described rotation of the sprocket 33 will rotate the driving member idly on the shaft 24, and, in order to effect driving relation between the driving and driven members, I provide the driving member with pairs of clutch members 38 and 39 located at opposite diametrical points on the face thereof adjacent the driven member and arranged to intermittently engage the flange 27 under control of the cam tracks previously described.

Each pair of clutch members includes an outer member 40 and an inner member 41. The outer member comprises a gripping jaw portion 42 having a curved inner end to engage the outer face of the flange 27 and a lever portion 43 extending outwardly at an obtuse angle to the gripping portion 42 so that it trails relatively to the direction of rotation of the driving member. The lever portion 43 terminates in spaced ears 44 and 45 carrying therebetween a pin 46 on which is mounted a roller 47 adapted to ride on the tracks 10 and 18 so that half of the roller operates on one cam and the other half on the other cam, as illustrated in Fig. 5. If desired, the rollers may be mounted on anti-friction bearings 48.

The clutch members thus described are pivoted on headed pins 49 extending through openings 50 and into threaded sockets 51 in the face of the rim 29. The inner clutch members 41 also have arcuate-shaped jaw portions 52 arranged to engage the inner face of the flange 27 on the driven member and are pivotally mounted on pins 53 extending through openings 54 therein and into threaded sockets 55 formed in the spokes of the disk in line with the sockets 51 previously described.

In order to move the inner clutch members into and from engagement with the flange of the driven member upon operation of the outer clutch members, the inner clutch members are provided with inwardly extending sockets 56 to receive lugs 57 fixed to the inner faces of the outer clutch members by fastening devices 58, as illustrated in Fig. 6. The sockets 56 and the lugs 57 thus form a toothed connection between the inner and outer clutch members so that when the outer member is moved by the rollers operating on the cam tracks, the inner clutch members will be simultaneously actuated to engage or disengage the driven member.

The outer clutch members are normally retained in engaging position with the driven member by springs 59 having loop portions 60 engaging against lever portions of the clutch members and provided with coiled portions 61 sleeved on pins 62 extending from the side face of the driving disk (Fig. 6). The springs terminate in ends 63 engaging pins 64 also projecting from the face of the driving disk in spaced relation with the pins 58.

In order to rotatively move the cam track member 14 relatively to the cam track formed on the inner face of the band 5, the hub portion 16 thereof may be provided with a reduced tubular sleeve portion 65 to which is keyed a worm gear segment 66 and meshing therewith is a worm 67 that is fixed to a shaft 68 rotatably mounted in bearing members 69 and 70 projecting downwardly from the bar member 20 previously described. The outer end of the shaft 68 is provided with a crank 71 whereby the worm may be rotated to actuate the gear segment for moving the track member 14 rotatably within the band 5 to shift the track 18 relatively to the track 10.

When the depressed portions in the respective tracks are in alignment with each other, the rollers operate on the low portions of the cam tracks during half of their revolution and on the high portions of the cam tracks during the other half of their revolution about the axis of the shaft. When the rollers are riding on the low portions of the cam tracks, the springs 59 move the clutch members into engagement with the rim of the driving member to effect its rotation and since one set of clutch members is located directly opposite to the other set of clutch members the driven member will be rotated continuously with the driving member for the reason that when one pair of clutch members is moved to releasing position by the high portions of the cam tracks, the other set of clutch members is moved into engagement with the driven member.

When the crank 71 is rotated to move the cam track so that the high portion thereof aligns with the depressed portion of the cam track, the rollers 47 will ride continuously on the high portions of the cam tracks, that is, they will be prevented from entering the low portion of one cam track by the high portion of the other cam track, and in this position the clutch members will be retained from engagement with the driven member during their entire planetation about the shaft 24 so that the effective movement of the driven member is zero. When the cam tracks are moved by the crank 71 to intermediate positions, it is apparent that the clutch members will engage the driven member to effect varying increments of movement depending upon the relative spacing between the low and high portions of the cam tracks.

In order to gauge the increments of movement of the driven member, the rim of the movable cam track 14 is provided with a scale as indicated at 72, which cooperates with a notched portion 73 formed in the edge of the band 5 to indicate the relative relation between the low portion of the respective tracks which govern the extent of clutch engagement with the driven member.

In operating a device constructed and assembled as described, the driving member is operably connected with a prime mover as is illustrated in Fig. 1, and the crank 71 is actuated to move the cam track 14 relatively to the cam track 11 to give the proper increment of movement between the driving and driven members.

As above pointed out, when the low portions of the cams align with each other, the rollers 47 are operating therein during 180° of their planetation so that when one pair of clutch members releases the driven member under influence of the roller of that pair riding upon the high portion of the cam track, the roller of the other pair of clutch members is entering the depression to effect engagement of that pair of clutch members so that rotation of the driven member is continuous, but when the cam track 14 is shifted relatively to the fixed cam track, the rollers are retained from entering the depressed portions of the cam tracks during a greater distance of their planetation. Consequently, the driven member will be intermittently actuated, receiving two impulses upon each revolution of the driving member due to the pairs of oppositely arranged clutch members. When the movable cam track is shifted so that the high portion thereof aligns with the depressed portion of the fixed cam track, the rollers will retain the clutch members from engagement throughout their entire planetation so that they are not effective in driving the driven member.

It is apparent that I have provided an improved intermittent speed transmission wherein the driving impulses applied to the driven member may be varied to suit the particular conditions for which the transmission is to be employed and that the increments of movement may be varied from zero to continuous rotation of the driven member by the driving member.

What I claim and desire to secure by Letters Patent is:

1. In a device of the character described, a driving member, a driven member, an annular flange on one of said members having inner and outer gripping surfaces, clutch means pivoted on the other of said members for engaging the outer gripping surface of the flange, a second clutch means pivoted on said other member to engage the inner surface of said flange, intermeshing means connecting said clutch means to effect simultaneous movement of each clutch means in the same direction relatively to the direction of movement of said members, a pair of cam members associated with the clutch means for actuating said clutch means upon operation of the driven member, and means moving one of said cam members relatively to the other for controlling the extent of engagement of said clutch means to effect intermittent movement of the driven member.

2. In a device of the character described, a circular support, a cam track in the support, a second cam track movable in the support relatively to the first named cam track, a shaft rotatably mounted on the support, a driving member rotatably mounted on the shaft, a driven member having a peripheral flange projecting toward the driving member and having inner and outer clutch engaging faces, clutch members pivotally mounted on the driving member and having gripping faces arranged to engage the outer and inner faces of said flange, a roller carried by one of the clutch members and operable on said tracks to move said clutch member into and out of engagement with the outer face of said flange, intermeshing means on the clutch members to effect simultaneous movement of each clutch member in the same direction relatively to the rotation of the driving member, a gear sector fixed to the movable cam track, a worm meshing with the gear sector, and means associated with the support for operating the worm to shift the movable cam track relatively to the first named cam track.

3. In a device of the character described, a circular support, a cam track in the support, a second cam track movable in the support relatively to the first named cam track, a shaft rotatably mounted on the support, a driving member rotatably mounted on the shaft, a driven member on the shaft having a peripheral flange projecting toward the driving member and provided with inner and outer clutch engaging faces, clutch members pivotally mounted on the driving member and arranged to engage the outer and inner faces of said flange, intermeshing means on the clutch members to effect simultaneous movement of the clutch members each in the same direction relatively to rotation of the driving member, a roller carried by one of the clutch members and operable on said tracks to move the clutch members into and out of engagement with said flange, means operably connected with the movable cam track to shift the movable cam track relatively to the first named cam track, a scale on the movable cam track, and means on the support cooperating with said scale to indicate relative positions of the cam tracks.

4. In a device of the character described, a circular support, a cam track in the support, a second cam track movable in the support relatively to the first named cam track, a shaft rotatably mounted on the support, a driving member rotatably mounted on the shaft, a driven member on the shaft having a peripheral flange provided with inner and outer clutch engaging faces and projecting toward the driving member, clutch members pivotally mounted on the driving member and arranged to engage the outer and inner faces of said flange, respectively a roller carried by one of the clutch members and operable on said tracks to move the clutch members into and out of engagement with the face of said flange, intermeshing teeth on the clutch members for operably interconnecting the clutch members for simultaneous movement into clutching engagement with said faces each in the same direction relatively to direction of rotation of the driving member, a gear sector fixed to the movable cam track, a worm meshing with the gear sector, means associated with the support for operating the worm to shift the movable cam track relatively to the first named cam track, a scale on the movable cam track, and means on the support cooperating with said scale to indicate the relative positions of said cam tracks.

5. In a device of the character described, rotary driving and driven members, a gripping flange on one of the members having inner and outer gripping surfaces, clutch members pivotally mounted on the other member and arranged to engage the respective gripping surfaces, intermeshing teeth associated with the clutch members to effect simultaneous engagement of the clutch members, and means for effecting intermittent engagement of the clutch members.

6. In a device of the character described, a driving member, a driven member, a flange on one of said members having inner and outer gripping surfaces, a clutch member pivoted on the other of said members for engaging the outer gripping surface of the flange, a second clutch member pivoted on said other member to engage the inner surface of said flange, toothed means connecting said clutch members to effect simultaneous movement of each clutch member in the same direction relatively to the direction of movement of said members to effect simultaneous engagement of the clutch members, and means for effecting intermittent engagement of said clutch members.

ALFRED E. HINE.